(12) United States Patent  (10) Patent No.: US 6,688,601 B2
Takahashi  (45) Date of Patent: Feb. 10, 2004

(54) MECHANICAL SEAL

(75) Inventor: Hidekazu Takahashi, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 3 days.

(21) Appl. No.: 09/988,577

(22) Filed: Nov. 20, 2001

(65) Prior Publication Data

US 2002/0060431 A1 May 23, 2002

(30) Foreign Application Priority Data

Nov. 21, 2000 (JP) ......................... 2000-353856

(51) Int. Cl.⁷ .............................. F16J 15/34; F16J 15/54
(52) U.S. Cl. ...................... 277/358; 277/393; 277/548
(58) Field of Search ................................. 277/358, 372, 277/393, 425, 547, 548

(56) References Cited

U.S. PATENT DOCUMENTS 2,247,505 A * 7/1941 Kohler ........................... 286/3
2,650,841 A * 9/1953 Meyer ........................... 286/11
3,117,793 A * 1/1964 Hauser et al. ................. 277/36
3,410,566 A * 11/1968 Wiese ........................... 277/81
3,746,350 A * 7/1973 Mayer et al. .................. 277/67
4,007,940 A * 2/1977 Chapa ........................... 277/32
4,103,906 A * 8/1978 Gits ............................. 277/88
4,127,275 A * 11/1978 Champlin ....................... 277/6
5,863,047 A * 1/1999 Ellis ........................... 277/374
6,460,858 B1 * 10/2002 Kitajima et al. ............. 277/370

* cited by examiner

Primary Examiner—Anthony Knight
Assistant Examiner—Michael J. Kyle
(74) Attorney, Agent, or Firm—Jacobson Holman PLLC

(57) ABSTRACT

A mechanical seal includes a fixed ring, a rotating ring and a shaft sleeve. The fixed ring is connected in a sealed state to a housing. The rotating ring has a slide part and an engaging part. The slide part faces and slidably contacts with the fixed ring. The engaging part is provided for adapting drivingly to engage in a concave-convex manner. The shaft sleeve has a stop part adapted drivingly to engage with the engaging part without relative rotation, and fitted and stopped to the rotating shaft in the sealed state.

3 Claims, 4 Drawing Sheets

MECHANICAL SEAL

FIELD OF THE INVENTION

This invention relates to a mechanical seal to be used as a shaft sealing means for a rotating machine such as a pump or the like.

DESCRIPTION OF THE RELATED ART

FIG. 4 shows a related art mechanical seal to be used as a shaft sealing means for large pumps. In FIG. 4, reference numeral 10 designates a housing of a shaft sealing part in a pump. A rotating shaft 20 is arranged in an inner circumference of the housing 10 so as to extend into a rotating machine. Numeral 30 designates a mechanical seal for sealing between the housing 10 and the rotating shaft 20. The mechanical seal 30 comprises a seal cover 31, sealing elements 32, a shaft sleeve 33, and sealing elements 34. The seal cover 31 is attached to the outside end of the housing 10. The sealing elements 32 at a stationary side are attached to the seal cover 31. The shaft sleeve 33 is externally fitted to the rotating shaft 20. The sealing elements 34 at a rotating side are attached to the shaft sleeve 33.

The seal cover 31 is arranged at the outside end of the housing 10, and is fixed by a bolt-nut 312.

The sealing elements 32 comprise a bellows 321 and a seal ring 322. The bellows 321 is arranged in an inner circumferential part of the seal cover 31 so as to extend into the machine. The seal ring 322 is sealed and fitted to a retainer 321b of its tip. The bellows 321 comprises, inside the seal cover 31, an adapter 321a, the retainer 321b, and a bellows core 321c. The adapter 321a is attached together with a baffle sleeve 325 via a gasket 324 by a bolt 323. The retainer 321b is arranged to the inside of the machine. The bellows core 321c is welded between the adapter 321a and the retainer 321b.

On the other hand, the shaft sleeve 33 is fixed to the rotating shaft 20 by a setscrew 332. The setscrew 332 is screwed in a radial direction from a sleeve collar 331. The sleeve collar 331 is arranged in an outer circumference of an enlarged diameter part 33a. The enlarged diameter part 33a is formed on its end part to the outside of the machine. A packing 333 is interposed between the enlarged part 33a of the shaft sleeve 33 and the rotating shaft 20. This packing 333 is appropriately pressed by a packing gland 335. The packing gland 335 is given tightening force by a bolt 334. The bolt 334 is screwed into the sleeve collar 331.

A setscrew 332 is screwed in a radial direction from the sleeve collar 331. The setscrew 332 penetrates the enlarged part 33a of the shaft sleeve 33 and the packing gland 335. The setscrew 332 is fitted by a pressure to the outer circumferential surface of the rotating shaft 20.

Further, the sealing elements 34 comprise a holder 342 and a mating ring 344. The holder 342 is externally fitted to the inside end 33b of the shaft sleeve 33 via the packing 341. The mating ring 344 is held by the holder 342 via a packing 343. The mating ring 344 is adapted drivingly to engage in a circumferential direction with a pin 342a of the holder 342 at a cutout part 344a. The mating ring 344 is also sealed and contacted with the seal ring 322 of the sealing elements 32 by each opposite end face.

At a rear surface of the holder 342, a collar 346 is attached via a bolt 345. A pin 346a is provided in the circumferential part. The pin 346a adapts drivingly to engage in a radial direction with a cutout part 33c. The cutout part 33c is formed on the inside end 33b of the shaft sleeve 33. Further, between an inner circumferential part of the collar 346 and an inner circumferential part of the holder 342, two-divided press ring 348 is grasped together with the packing 341 and a spacer 347 pressing therewith. The inner circumferential part of the press ring 348 is fitted to a ring-like groove. The ring-like groove is formed on the outer circumferential surface of the inside end 33b of the shaft sleeve 33. Thereby axial movement of the sealing elements 34 is limited relative to the shaft sleeve 33.

That is, in the mechanical seal 30, the end face of the seal ring 322 of the sealing elements 32 slidably contacts with the end face of the mating ring 344 of the sealing elements 34 by enforcement in an axial direction of the bellows 321. Here the end face of the seal ring 322 is held in a non-rotating state with the seal cover that is attached to the housing 10. The end surface of the mating ring 344 is rotated integrally with the rotating shaft 20. Thereby it prevents a sealed fluid in the machine from flowing out from between the housing 10 and the rotating shaft 20 to the outside of the machine. At the sealing elements 34, rotating force of the rotating shaft 20 is transmitted to the mating ring 344 via the shaft sleeve 33, the collar 346, the holder 342, and the pin 342a. Here the shaft sleeve 33 is fixed to the rotating shaft 20 by the setscrew 332. The collar 346 is adapted drivingly to engage with an inside cutout end 33c via a bin 346a. The holder 342 is connected by the bolt 345. The pin 342a is provided on the holder 342.

However, according to the above-described mechanical seal 30, the mating ring 344 of the rotating side is constituted to fit to the ring-like recessed part of the holder 342. Therefore, the size in the radial direction of the sealing elements 34 becomes in large. Accordingly, the large inner diameter of the housing 10 in the pump is necessary, which causes the large size of the whole machine. Further, the packing 343 is necessary for sealing between the mating ring 344 and the holder 342. Therefore, this packing 343 needs high costs because of the large diameter.

Moreover, concerning the sealing elements 34, the pin 342a and the cutout 344a are necessary for the holder 342 and the mating ring 344 as a rotation transmitting means. The collar 346, the bolt 345, the spacer 347, and the pressing ring 348 or the like are necessary for the holder 342 as a fixing means in the axial direction. The pin 346a and the cutout part 33c are necessary for the collar 346 and the shaft sleeve 33 as a rotation transmitting means. Thus, these elements had complement forms and structures. Therefore, attachment work is so complicated that it takes long time, since the sealing elements 34 have the large number of elements.

Moreover, the sealing elements 34 need the large number of elements. If a few errors of the size or in attachment work were accumulated, the slide and contact position of the mating ring 344 largely slips off relative to the seal ring 322, even if the attachment position of the shaft sleeve 33 is exact relative to the rotating shaft 20. This leads possibly to generate large errors for the slide surface pressure.

SUMMERY OF THE INVENTION

The main object of the invention is to decrease the number of elements or parts to be used.

Another object of this invention is to provide a mechanical seal that can achieve its miniaturization and easy and rapid attachment work.

A mechanical seal according to one mode of this invention comprises a fixed ring connected in a sealed state to the housing and having a forcing means that is forced in an axial direction; a rotating ring having a slide part and an engaging part, wherein the slide part faces and slidably contacts with the fixed ring, and wherein the engaging part is formed for adapting drivingly to engage in a concave-convex manner; and a shaft sleeve fitted one end part in the sealed state to the rotating ring, holding the rotating ring in the axial direction, having a stop part adapted drivingly to engage with the engaging part without relative rotation, and fitted and stopped to the rotating shaft in the sealed state.

DESCRIPTION OF THE PREFERRED EMBODIMENTS

Figure 1:
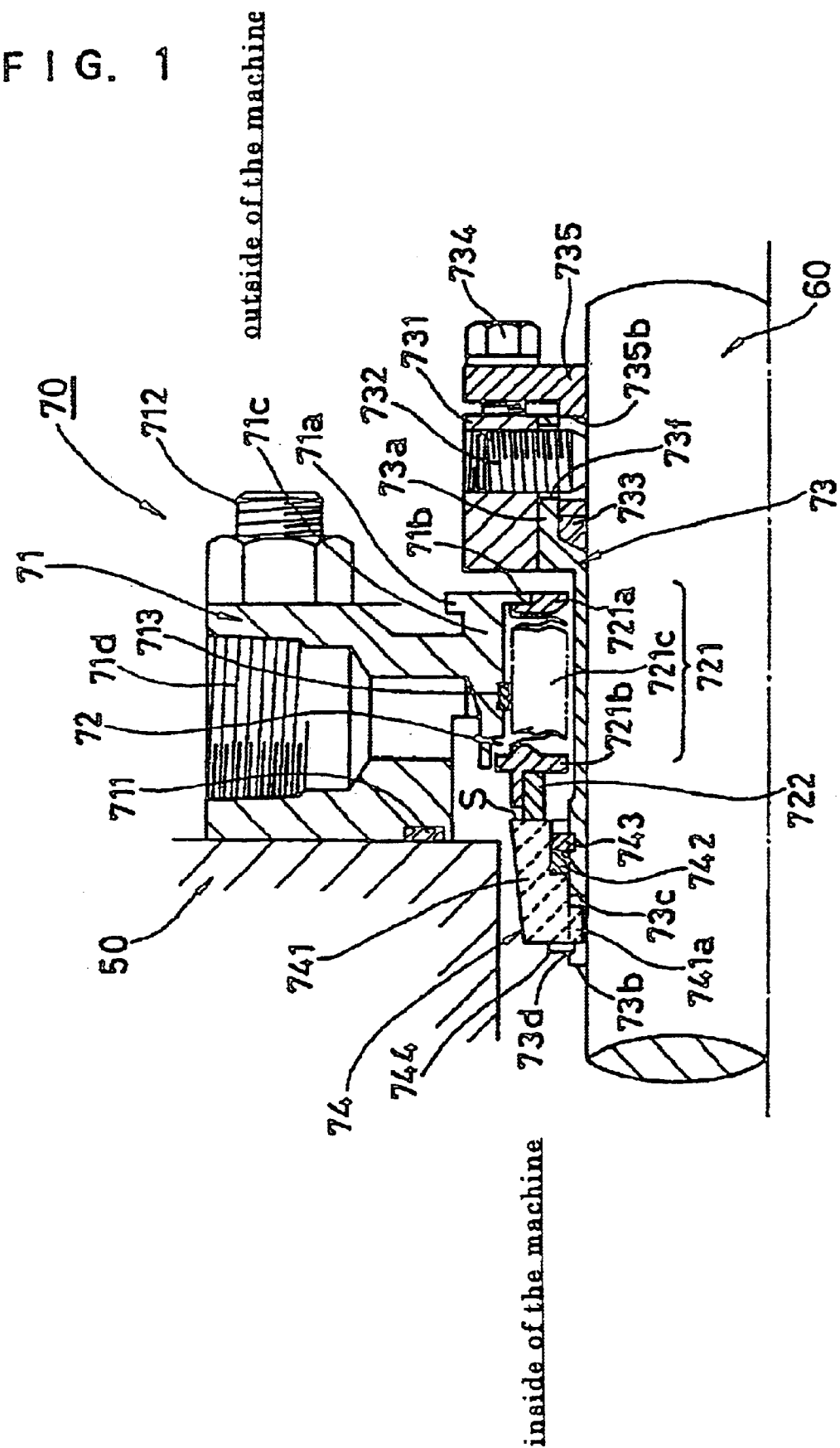
FIG. 1 is a semi sectional view showing a mechanical seal according to a preferred embodiment of the invention, which shows an attached state by cutting with a plane passing through a shaft center.

FIG. 1 is a semi sectional view of a mechanical seal according to a preferred embodiment of the invention, which shows an attached state by cutting with a plane passing through a shaft center. Reference numeral 50 designates a housing at a shaft sealing part. Numeral 60 designates a rotating shaft. The rotating shaft 60 is inserted in an inner circumference of the housing 50. The rotating shaft 60 rotates a pumping mechanism as an impeller in the machine. Numeral 70 designates a mechanical seal according to the invention. The mechanical seal 70 comprises a seal cover 71, stationary sealing elements 72, a shaft sleeve 73, and rotating sealing elements 74. Here the seal cover is attached to the outside end of the housing 50. The stationary sealing elements 72 are attached to the seal cover 71 at a stationary side. The shaft sleeve 73 is externally fitted to the rotating shaft 60. The rotating sealing elements 74 are attached to the shaft sleeve 73 at a rotating side.

A seal cover 71 is arranged at the outside end of the housing 50 via a gasket 711 and is fixed by a bolt-nut means 712. At the outside end of the inner circumferential part of the seal cover 71, an outward protruding part 71a, an inward flange 71b inside thereof, and a cylindrical part 71c. The outward protruding part 71a can be adapted drivingly to engage with a setting jig 75 described below. The cylindrical part 71c extends to the inside of the machine therefrom.

The sealing elements 72 comprise a bellows 721 and a seal ring 722. The bellows 721 is attached to the inner circumferential part of the seal cover 71. The bellows 721 extends to the inside of the machine as a sealing means and enforcing means. The seal ring 722 is constituted as a fixed ring sealed and fitted to a retainer 721b of the movable end. The bellows 721 comprises an adapter 721a, a retainer 721b, and a bellows core 721c. The adapter 721a is connected in a sealed state by welding or brazing or the like to the inward flange part 71b of the seal cover 71. The retainer 721b is movably arranged on the inner circumference of the inside end of the cylindrical part 71c of the seal cover 71. The bellows core 721c is welded between the adapter 721a and the retainer 721b. Further, a circular damper 713 is attached on an inner circumferential surface of the cylindrical part 71c of the seal cover 71. The circular damper 713 has a small space with the outer circumference of the bellows core 721c. Thereby vibration of the bellows 721 is prevented. Vibration of the sealing elements 72 is further prevented.

On the other hand, the shaft sleeve 73 is fixed to the rotating shaft 60 by a setscrew 732. The setscrew 732 is screwed in a radial direction from a sleeve collar 731. The sleeve collar 731 is arranged on the outer circumference of an enlarged part 73a. The enlarged part 73a is formed to the outside end of the machine. A packing 733 is interposed between the enlarged part 73a of the shaft sleeve 73 and the rotating shaft 60. The packing 733 is appropriately pressed by a packing gland 735. A tightening force is given to the packing gland 735 by a bolt 734. The bolt 734 is screwed to the sleeve collar 731. In the embodiment shown in the figure, the shaft sleeve 73 inserts one end part to an inside of a machine and has a tightening means 732 for tightening another end part at an outside of the machine.

Further, the setscrew 732 is screwed in a radial direction from the sleeve collar 731. The setscrew 732 penetrates a hole 73f and a hole 735b for inserting the setscrew, and contacts by a pressure with the outer circumferential surface of the rotating shaft 60. Here, the hole 73f is opened at the enlarged diameter part 73a of the shaft sleeve 73. The hole 735b is opened at a cylinder part 735a of an inner circumference of the packing gland 735. The cylinder part 735a is inserted in the inner circumference thereof. Further, on the outer circumferential surface of the sleeve collar 731, one or more screw hole(s) (not shown in the figure) is/are formed in a circumferential direction for fixing a setting jig 75 described below.

The sealing elements 74 are externally fitted to the inside end of the shaft sleeve 73. Further, it comprises a mating ring 741, a packing 742, a two-divided press ring 743, and a stop ring 744. The mating ring 741 is constituted as a rotating ring that is sealed and contacted with the seal ring 722 of the sealing elements 72 with its opposite end. The packing 742 seals between the shaft sleeve 73 and the mating ring 741. The two-divided pressing ring 743 presses the packing 742. The stop ring 744 stops from falling the mating ring 741 from the shaft sleeve 73.

Figure 2:
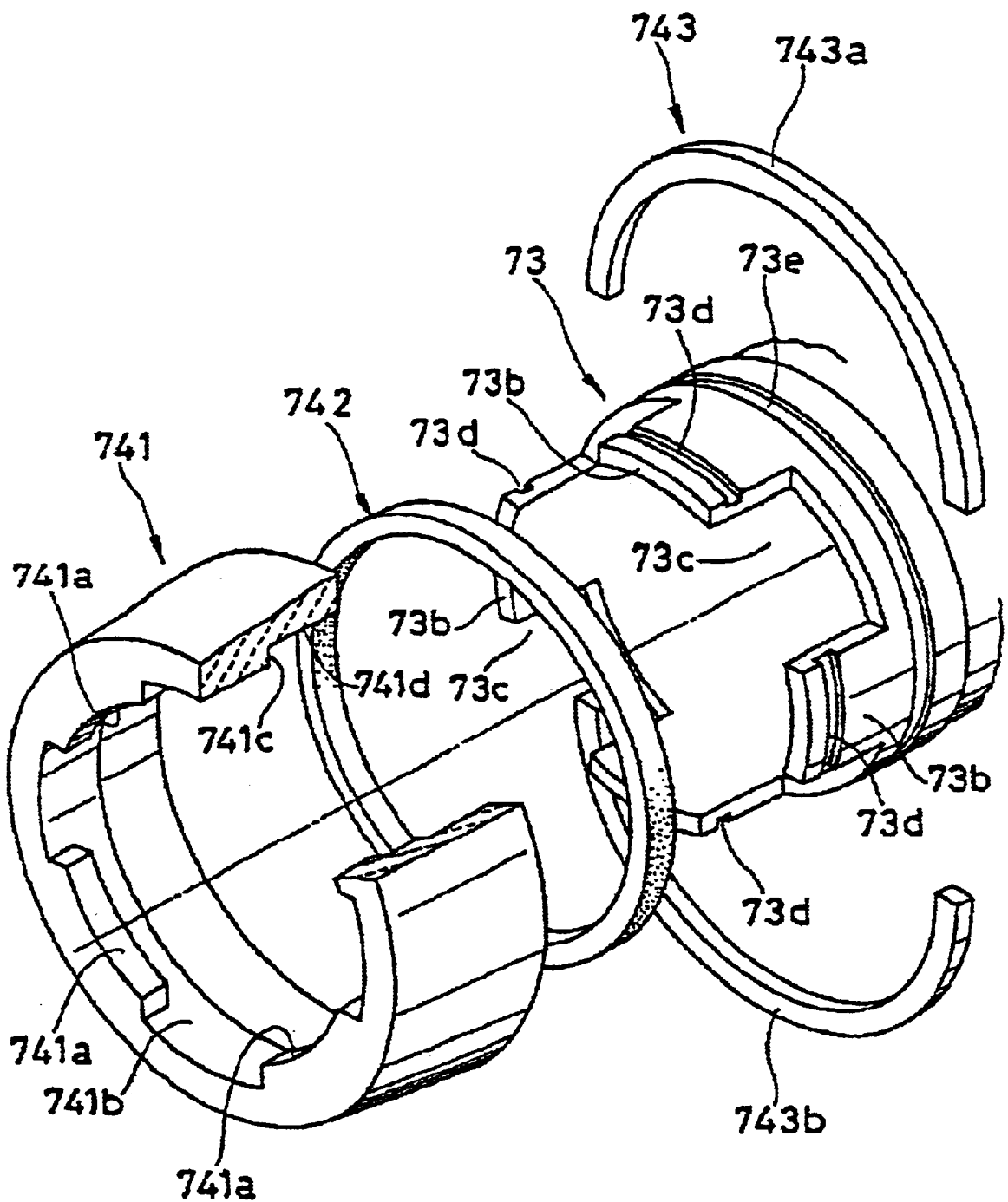
FIG. 2 is an exploded perspective view showing a mechanical seal according to a preferred embodiment of the invention, which shows an end part of the shaft center to the inside of the machine, a mating ring and a packing and a pressure ring attached thereto.

FIG. 2 is a perspective view showing the inside end of the shaft sleeve 73, the mating ring 741 attached thereto, the packing 741, and the pressing ring 743. The mating ring 741 in a circumferential direction is partially shown in a sectional view.

As more clearly shown in FIG. 2, on the inside end of the shaft sleeve 73, a plurality (four in the shown example) of engaging protrusions 73b are formed so as to extend in a axial direction at regular intervals in a circumferential direction. That is, a stop part 73c is formed between each engaging protrusion 73b. On the outer circumferential surface near the end of each engaging protrusion 73b, stop ring attachment grooves 73d are formed so as to extend in the circumferential direction at the positions corresponding to each other. Further, on the outer circumferential surface relative to the part formed of the engaging protrusions 73b, a groove 73e for attaching the press ring is formed in continuing in a circumferential direction. The groove 73e is positioned at the inner position compared to a slide part S with the seal ring 722 of the mating ring 741.

In addition, the mating ring 741 forms a gradually tapered structure that forms an enlarged diameter of the outer circumferential surface to the side of the slide part S with the seal ring 722. At the inside end of the inner circumferential surface, engaging protrusions 741a are formed in a circumferential direction at regular intervals. The engaging protrusions 741a are loosely fitted to the stop parts 73c between each engaging protrusion 73b of the shaft sleeve 73. That is, the number of the engaging protrusions 741a is the same (four in the shown example) as the engaging protrusions 73b of the shaft sleeve 73. Preferably, when the engaging parts 741a are fitted to the engaging protrusions 73b, the engaging parts 741a are stopped in the rotational and axial direction relative to the engaging protrusions 73b. In the embodiment shown in the figure, the stop part 73c is cut out at one end part in the axial direction and is formed plurally in a circumferential direction. Further, the engaging part 741a is formed so as to insert into the stop part 73c in the axial direction.

Further, the inner diameter of each engaging protrusion 741a of the mating ring 741 is set being able to loosely fit to the outer circumferential surface of the rotating shaft 60. A diameter of inner circumferential surfaces 741b is set being able to loosely fit the outer circumferential surface of each engaging protrusion 73b of the shaft sleeve 71. Here the engaging protrusions 741a are formed on the inner circumferential surfaces 741b.

On the inner circumferential surface of the mating ring 741, a step part 741c with an enlarged diameter is continuously formed in the circumferential direction at the outer side of the machine relative to the engaging protrusions 741a, that is, the side of the slide part S with the seal ring 722. Further, a push ring 743 comprises a two-divided structure of semicircular divided particles 743a, 743b, and fitted to the groove 73e for attachment of the push ring of the shaft sleeve 73. Thereby the outer circumferential surface is loosely fitted to an inner circumferential surface 741d of the larger diameter side (slide end surface side) of the step part 741c of the mating ring 741. In addition, the packing 742 is arranged between the press ring 743 and the step part 741c. The packing 742 seals between the shaft sleeve 73 and the mating ring 741.

Furthermore, reference numeral 71d in FIG. 1 designates a flushing hole that is opened on the seal cover 71. A line is connected for flowing back of one part of a fluid (a sealed fluid by the mechanical seal 70). The fluid is send with pressure by an impeller (not shown) rotated by the rotating shaft 60. That is, one part of the sealed fluid flows via the slide part S of the flushing hole 71d and through the outer circumferential space of the seal ring 722 and the mating ring 741. Thereby heat of slide generated at the slide part S of the seal ring 722 and the mating ring 741 is effectively eliminated.

In the mechanical seal 70 having a constitution as explained above, the end surface of the seal ring 722 of the sealing elements 72 slidably contacts with the end surface of the mating ring 741 of the sealing elements 74 by enforcement in the axial direction of the bellows 721. Here, the sealing elements 72 are held in a non-rotating state on the inner circumferential part of the seal cover 71. The seal cover 71 is attached to the housing 50. The sealing elements 74 are rotated integrally with the rotating shaft 60. The slide part S is thus formed. Thereby, it is prevented that the sealed fluid in the machine flows out from between the housing 50 and the rotating shaft 60 to the outside of the machine. At this time, at the sealing elements 74, rotating power of the rotating shaft 60 is transmitted from the shaft sleeve 73 to the mating ring 741 via a fitting surface of the engaging protrusions 73b and the engaging protrusions 741a. Here, the shaft sleeve 73 is fixed to the rotating shaft 60 by the setscrew 732. The engaging protrusions 73b are formed on the inside end. The engaging protrusions 741a are formed on the inner circumferential surface of the mating ring 741.

According to the mechanical seal 70, the attachment position of the mating ring 741 in the axial direction relative to the shaft sleeve 73 is determined only by the stop ring 744. Here the stop ring 744 is fitted to the grooves 73d of the shaft sleeve 73. Therefore, an error of the attachment position in the axial direction of the mating ring 741 can be diminished. Further, since the mating ring 741 is directly engaged with the shaft sleeve 73, the number of the elements is small compared to the prior one, which is attached by a holder or a collar. Thus, the size of the sealing elements 74 can be miniaturized in the axial and radial directions.

Further, in addition to the small number of the elements of the sealing elements 74, the mating ring 741 is different from the prior one that is fitted to the holder. The packing with a large diameter is unnecessary for sealing such holder. Therefore, the cost of the elements can be lowered.

Further, since vibration of the bellows 721 at the sealing elements 72 is prevented by the dumper 713 that is attached to the inner circumferential surface of the cylindrical part 71c of the seal cover 71, the structure at the stationary side can be simple.

Figure 3:
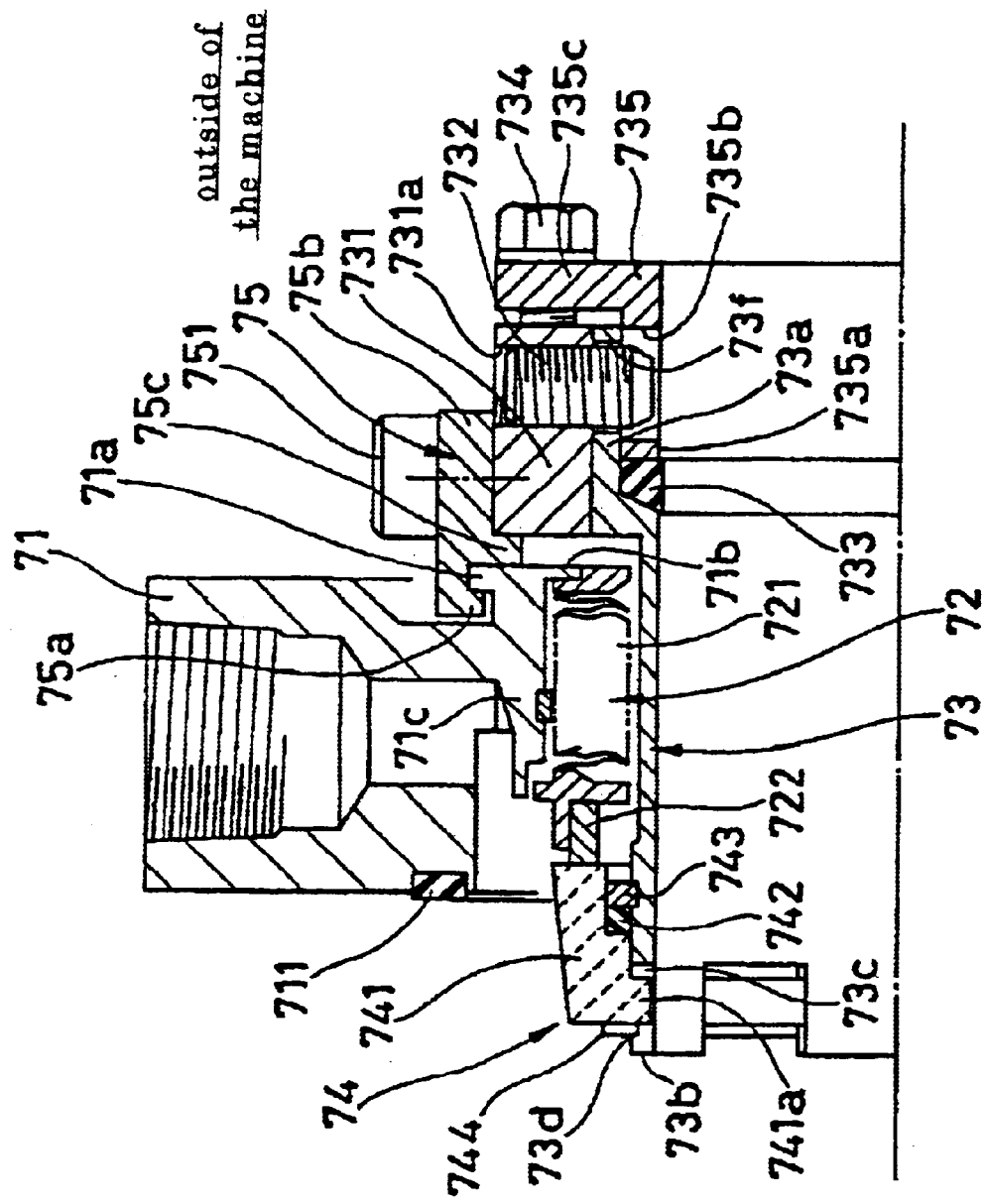
FIG. 3 is a semi sectional view showing a mechanical seal according to a preferred embodiment of the invention, which shows an unattached state by cutting with a plane passing through a shaft center.
Figure 4:
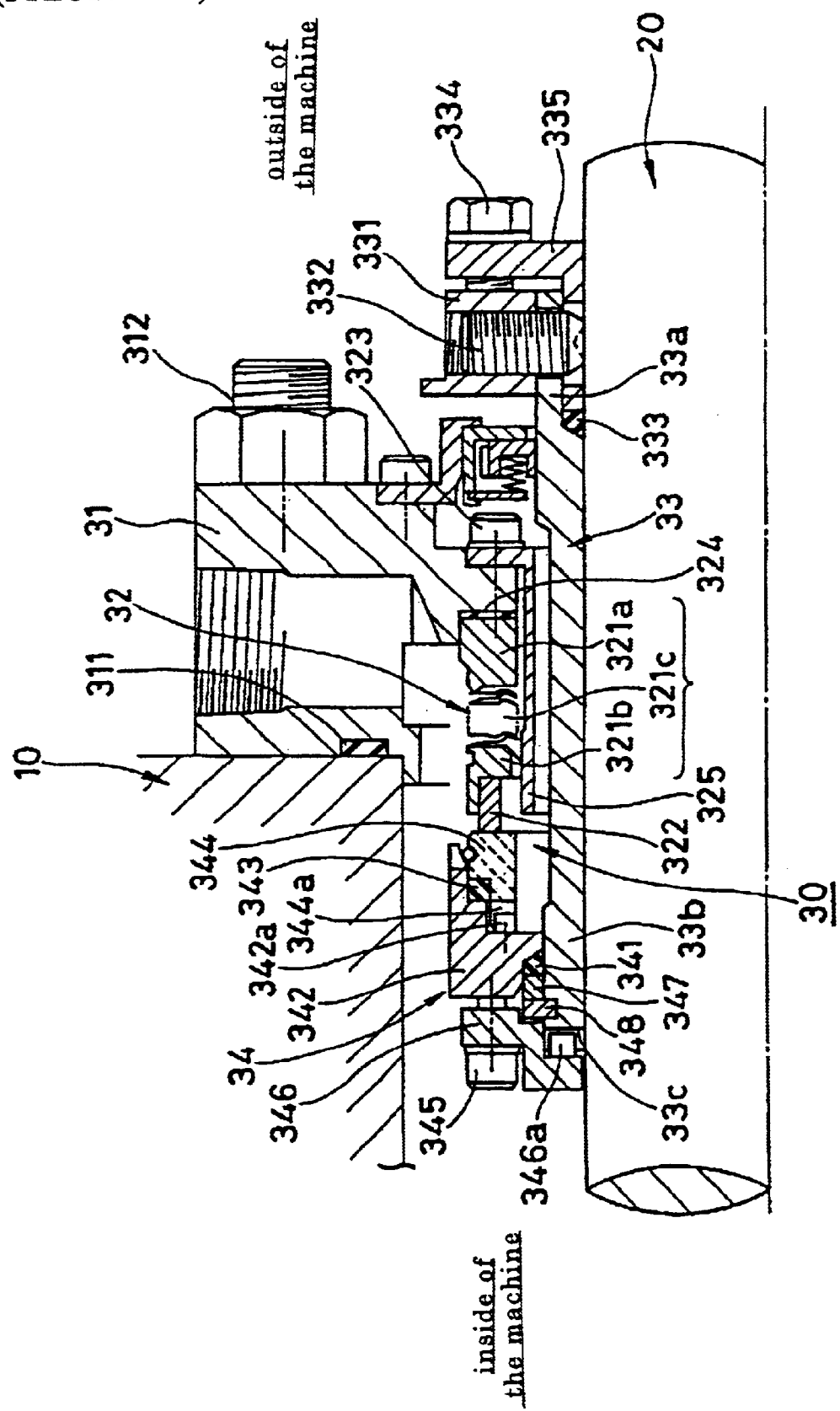
FIG. 4 is a semi sectional view showing a related art mechanical seal, which shows an attached state by cutting with a plane passing through a shaft center.

FIG. 3 shows a state before installing the mechanical seal 70 to the housing 50 and the rotating shaft 60. That is, in the mechanical seal 70 having the structure stated above, the sealing elements 72 comprises the bellows 721 and the seal ring 722, and initially provides integrally with the inward flange part 71b of the inner circumference of the seal cover 71.

The shaft sleeve 73 is arranged in the inner circumference of the sealing elements 72. The packing 733 is arranged in the inner circumference of the enlarged part 73a that is formed to the outside end of the machine. Further, the cylinder part 735a of the packing gland 735 is inserted for holding the packing 733 from the outside. Further, the sleeve collar 731 is inserted in the enlarged diameter part 73a of the shaft sleeve 73. Then, the screw hole 731a of the sleeve collar 731, the hole 735b of the cylinder part 735a of the packing gland 735, and the hole 73f of the enlarged diameter part 73a of the shaft sleeve 73 are piled each other in a radial direction. The setscrew 732 is inserted from the screw hole 731a of the sleeve collar 731. Each tightening bolt 734 is screwed in the axial direction from a bolt insertion hole (not shown in the figure). The bolt insertion hole is opened on the outer circumferential flange part 735c of the packing gland 735 at certain intervals in the circumferential direction. Thereby, the shaft sleeve 73, the packing gland 735, and the sleeve collar 731 are temporarily connected each other.

Reference numeral 75 in FIG. 3 designates a setting jig as a positioning means. At one end, a hook part 75a is formed to be hooked with the outward protruding part 71a that is formed on the seal cover 71. At the other end part 75b, a hole for inserting a bolt (not shown in the figure) is opened. The bolt penetrates in a radial direction. At the inner circumference of the intermediate part, a spacer part 75c is formed, which is interposed between the outside end of the cylindrical part 71c and the sleeve collar 731. Further, the hook part 75a of the setting jig 75 is engaged with the outward protruding part 71a of the seal cover 71. The inner circumferential surface of the other end part 75b is piled on the outer circumferential surface of the sleeve collar 731 and fixed by a bolt 751. Then, a relative position of the shaft sleeve 73 in the axial direction relative to the seal cover 71 is determined via the setting jig 75 and the sleeve collar 731.

At the end part of the shaft sleeve 73, the sealing elements 74 are installed. Here the end part of the shaft sleeve 73 reaches the inner side of the machine in respect to the seal ring 722 through the inner circumference of the sealing elements 72. When installing the sealing elements 74, the packing 742 is externally fitted to the outer circumferential surface between the engaging protrusions 73b of the shaft sleeve 73 and the groove 73e. Two divided push ring 743 is installed in the groove 73. The mating ring 741 is externally fitted to the end part of the shaft sleeve 73 so that each engaging protrusion 741a is loosely fitted between each engaging protrusion 73b of the shaft sleeve 73. Further, the stop ring 744 is installed to the grooves 73d that are formed over each engaging protrusion 73b of the shaft sleeve 73. Thereby, the packing 742 and the push ring 743 are interposed with the inner circumferential surface 741d of the step part 741c at the large diameter side (the side of the slide part S). The mating ring 741 is installed to the shaft sleeve 73 in a state that its end face is contacted with the seal ring 722.

The packing 742 may be held initially by the inner circumferential surface 74d at the large diameter side of the step part 741c of the mating ring 741 and be constituted so as to externally fit to the shaft sleeve 73 together with the mating ring 741.

Further, a snap ring is used as the stop ring 744, which has typically one discontinuous part in a circumferential direction, namely substantially C-shape. When each engaging protrusion 73b of the shaft sleeve 73 has some extent of elasticity in a radial direction, it may be constituted of a circular shape continuing in a circumferential direction.

In this state as explained above, the relative position of the shaft sleeve 73 in the axial direction relative to the seal cover 71 is determined via the setting jig 75 and the sleeve collar 731. Therefore, relation between the sealing elements 72 and the sealing elements 74 is also determined. Here, the sealing elements are provided integrally with the seal cover 71. The sealing elements are installed to the shaft sleeve. Therefore, as shown in FIG. 3, the bellows 721 at the sealing elements 72 is pressed in a certain axial direction. Thereby, the opposite faces of the seal ring 722 and the mating ring 741 are closely contacted each other by a certain surface pressure.

Next, the shaft sleeve 73 is then externally fitted to the rotating shaft 60. The seal cover 71 is fixed to the outside end of the housing 50 by the bolt-nut 712. The setscrew 732 is rotated in a fitting direction. Its top end contacts by a pressure with the outer circumferential surface of the rotating shaft 60 via the holes 73f, 735b. The holes 73f, 735b are opened at the enlarged diameter part 73a of the shaft sleeve 73 and the cylinder part 735a of the packing gland 735. Thereby, the shaft sleeve 73 is fixed to the outer circumferential surface of the rotating shaft 60 via the sleeve collar 731 and the setting jig 75 in a state that the shaft sleeve 73 is positioned to the seal cover 71.

Then, after fixing the seal cover 71 to the housing 50 and fixing the shaft sleeve 73 to the rotating shaft 60, the setting jig is detached together with the bolt 751, which is shown as an attachment condition in FIG. 1.

That is, according to the mechanical seal 70 of the invention, the shaft sleeve 73 is initially positioned via the setting jig 75 and the sleeve collar 731. Thereby it is installed to the housing 50 and the rotating shaft 60 in a state that the sealing elements 72 and the sealing elements 74 are positioned each other.

The hole 735b is formed in a long hole shape so as to extend in the axial direction. The hole 735b is opened at the cylinder part 735a of the packing gland 735. After fixing the shaft sleeve 73 to the rotating shaft 60 by the sleeve collar 731 and the setscrew 732, the packing gland 735 is movable in the axial direction by the fitting bolt 734. Thus, the packing 733 can be pressed by a necessary and appropriate fitting force for sealing between the rotating shaft 60 and the shaft sleeve 73.

According to the mechanical seal of the invention, the rotating ring has the engaging part for engaging in a concave-convex manner, and the shaft sleeve has the stop part adapted drivingly to engage the engaging part. Therefore, because both are connected, holder, collar, pin, bolt, and spacer etc. are unnecessary. Miniaturization is possible because the sealing elements at the rotational side are unnecessary.

Further, attachment work is simple because the stop part of the shaft sleeve can be inserted into the engaging part of the rotating ring in the axial direction. Miniaturization is further preceded because one end part of the shaft sleeve can be minimized in diameter.

Further, attachment and positioning work is quite simple because another end part of the shaft sleeve, which is opposed to the inserting position, can be tightened to the rotating shaft by the tightening means.

What is claimed is:

1. A mechanical seal, comprising:

a housing;

a plurality of stationary sealing elements including a fixed ring fixed in a rotating direction relative to the housing and means for biasing the fixed ring in an axial direction;

a rotary shaft located in the housing;

a shaft sleeve fixed to the rotary shaft in a sealed state;

a plurality of rotary sealing elements including a rotary ring provided on an outer circumference of the shaft sleeve in a sealed sate so as to rotate together with the rotary shaft, wherein the rotary ring contacts the fixed ring and has an engaging part for engaging the shaft sleeve in a non-rotating state; and means for stopping the rotary ring in the axial direction, wherein the stopping means includes a stop ring and a two part push ring attached in a groove formed on an outer periphery of the shaft sleeve, wherein the stationary sealing elements are provided on a seal cover that is attached in a sealed state to the housing, and the two part push ring including semicircular divided pieces.

2. A mechanical seal according to claim 1, wherein the engaging part of the rotary ring has an engaging protrusion and the shaft sleeve has an engaging protrusion, wherein the engaging protrusion of the rotary ring is formed on an inner circumferential surface of the rotary ring, and wherein the engaging protrusion of the shaft sleeve is formed on an end part of the shaft sleeve so as to engage the engaging protrusion.

3. A mechanical seal according to claim 2, wherein a stop groove is formed on the engaging protrusion of the shaft sleeve and wherein the ring is fitted in the stop groove.

* * * * *